US012609747B2

(12) United States Patent
Bai et al.

(10) Patent No.: US 12,609,747 B2
(45) Date of Patent: Apr. 21, 2026

(54) BEAM REPORT COMPRESSION BASED ON LINEAR PRINCIPAL COMPONENT ANALYSIS

(71) Applicant: QUALCOMM Incorporated, San Diego, CA (US)

(72) Inventors: Tianyang Bai, Somerville, NJ (US); Hua Wang, Basking Ridge, NJ (US); Junyi Li, Fairless Hills, PA (US)

(73) Assignee: QUALCOMM INCORPORATED, San Diego, CA (US)

( * ) Notice: Subject to any disclaimer, the term of this patent is extended or adjusted under 35 U.S.C. 154(b) by 177 days.

(21) Appl. No.: 18/464,645

(22) Filed: Sep. 11, 2023

(65) Prior Publication Data

US 2025/0088249 A1      Mar. 13, 2025

(51) Int. Cl.
*H04B 7/06* (2006.01)
*H04W 24/10* (2009.01)

(52) U.S. Cl.
CPC ......... *H04B 7/0628* (2013.01); *H04B 7/0617* (2013.01); *H04B 7/063* (2013.01); *H04W 24/10* (2013.01)

(58) Field of Classification Search
CPC ............................. H04B 7/0628; H04W 24/10
See application file for complete search history.

(56) References Cited

U.S. PATENT DOCUMENTS

2024/0108272 A1 *   4/2024   Hendler ................. A61B 5/372
2025/0261890 A1 *   8/2025   Iwata ..................... A61B 5/242

* cited by examiner

*Primary Examiner* — Zhiren Qin
(74) *Attorney, Agent, or Firm* — Harrity & Harrity, LLP

(57) ABSTRACT

Various aspects of the present disclosure generally relate to wireless communication. In some aspects, a user equipment (UE) may receive a plurality of reference signals, each reference signal of the plurality of reference signals corresponding to a beam of a plurality of beams. The UE may transmit a beam report comprising measurement information associated with the plurality of reference signals, wherein the measurement information is based on an output of a linear principal component analysis (PCA) filter. Numerous other aspects are described.

30 Claims, 9 Drawing Sheets

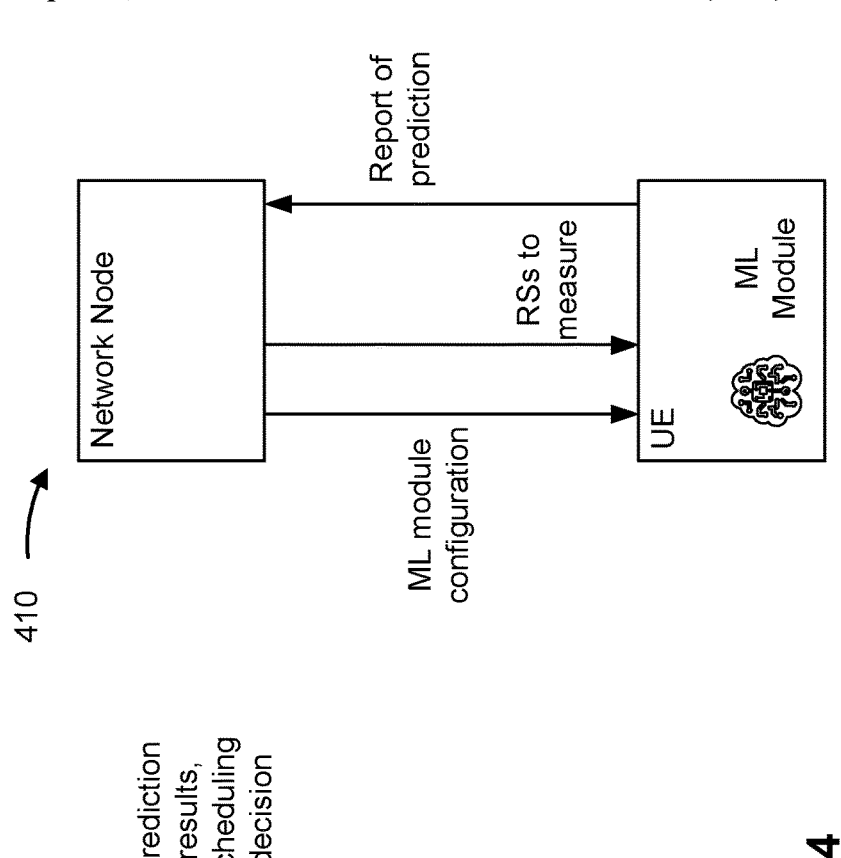
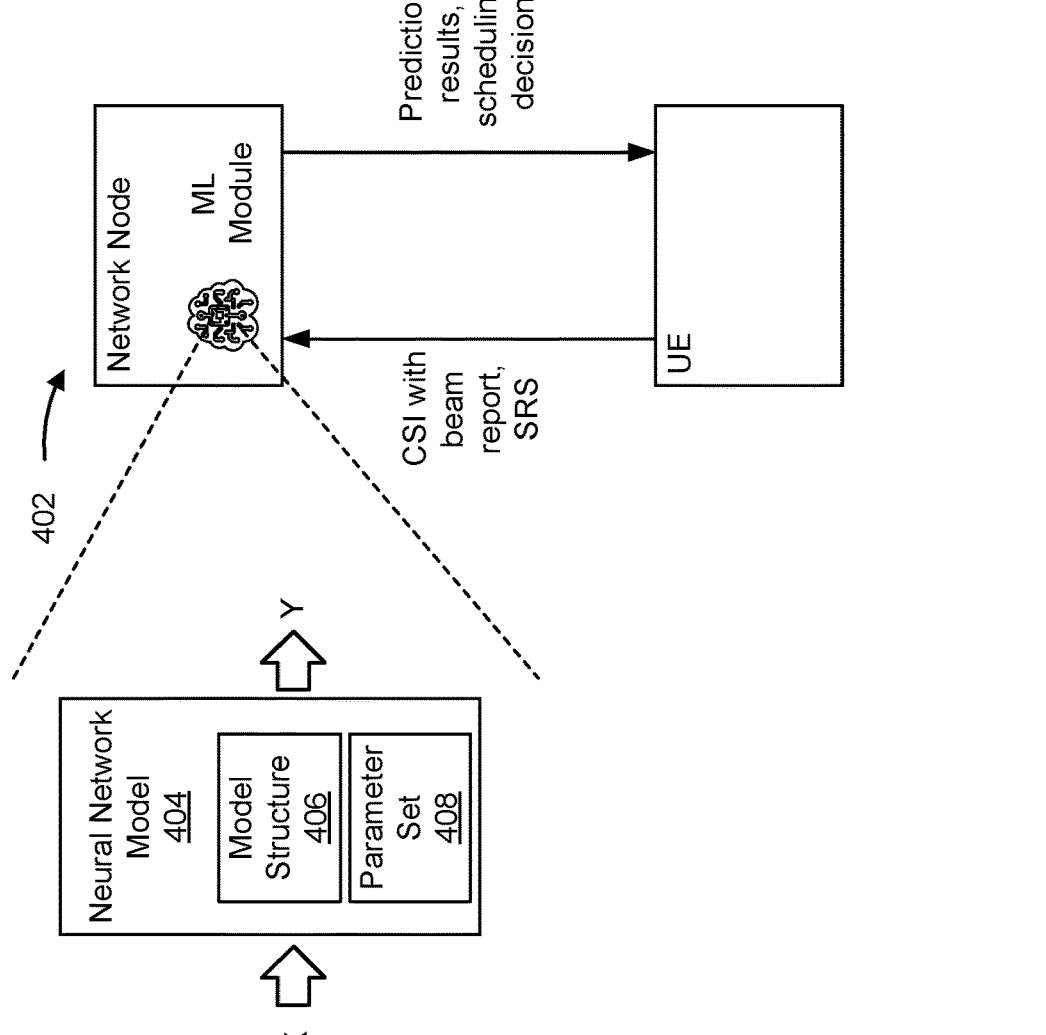
FIG. 4

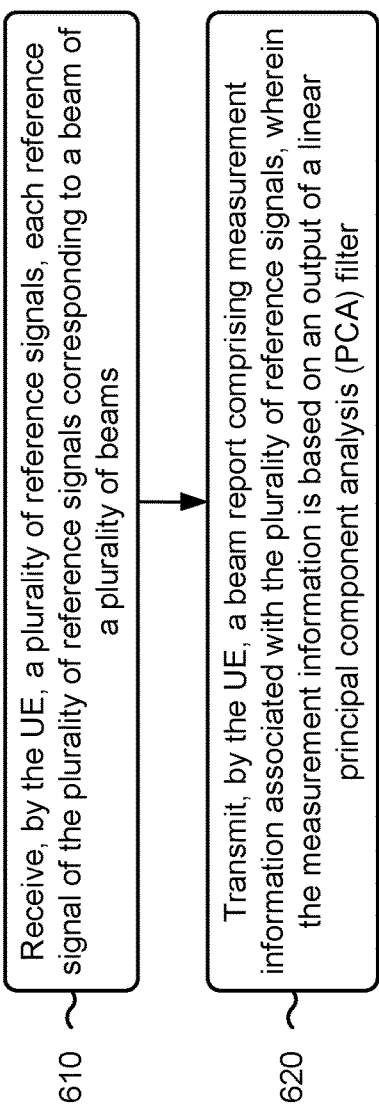

610    Receive, by the UE, a plurality of reference signals, each reference signal of the plurality of reference signals corresponding to a beam of a plurality of beams 620    Transmit, by the UE, a beam report comprising measurement information associated with the plurality of reference signals, wherein the measurement information is based on an output of a linear principal component analysis (PCA) filter

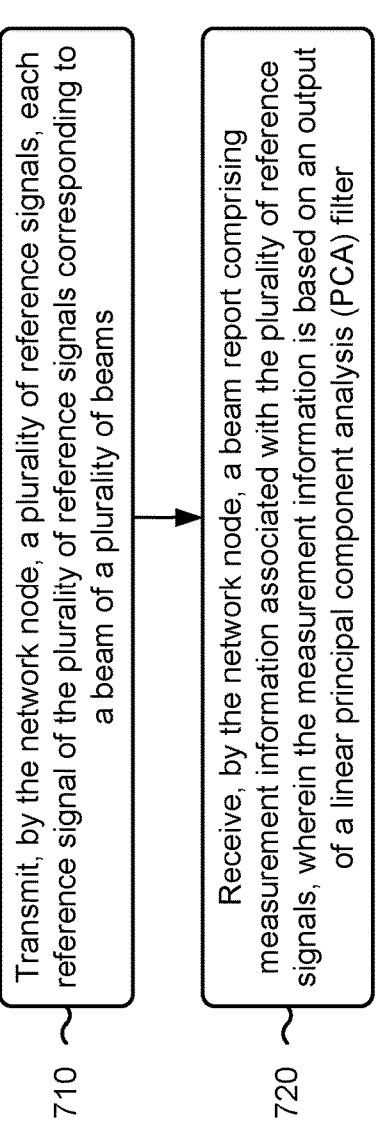

700

710 Transmit, by the network node, a plurality of reference signals, each reference signal of the plurality of reference signals corresponding to a beam of a plurality of beams 720 Receive, by the network node, a beam report comprising measurement information associated with the plurality of reference signals, wherein the measurement information is based on an output of a linear principal component analysis (PCA) filter

Reception Component 802

Communication Manager 806

Transmission Component 804

808

BEAM REPORT COMPRESSION BASED ON LINEAR PRINCIPAL COMPONENT ANALYSIS

FIELD OF THE DISCLOSURE

Aspects of the present disclosure generally relate to wireless communication and to techniques and apparatuses for beam report compression based on linear principal component analysis.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include one or more memories and one or more processors coupled to the one or more memories. The one or more processors may be configured to receive a plurality of reference signals, each reference signal of the plurality of reference signals corresponding to a beam of a plurality of beams. The one or more processors may be configured to transmit a beam report comprising measurement information associated with the plurality of reference signals, wherein the measurement information is based on an output of a linear principal component analysis (PCA) filter.

Some aspects described herein relate to an apparatus for wireless communication at a network. The apparatus may include one or more memories and one or more processors coupled to the one or more memories. The one or more processors may be configured to transmit a plurality of reference signals, each reference signal of the plurality of reference signals corresponding to a beam of a plurality of beams. The one or more processors may be configured to receive a beam report comprising measurement information associated with the plurality of reference signals, wherein the measurement information is based on an output of a linear PCA filter.

Some aspects described herein relate to a method of wireless communication performed by a UE. The method may include receiving, by the UE, a plurality of reference signals, each reference signal of the plurality of reference signals corresponding to a beam of a plurality of beams. The method may include transmitting, by the UE, a beam report comprising measurement information associated with the plurality of reference signals, wherein the measurement information is based on an output of a linear PCA filter.

Some aspects described herein relate to a method of wireless communication performed by a network node. The method may include transmitting, by the network node, a plurality of reference signals, each reference signal of the plurality of reference signals corresponding to a beam of a plurality of beams. The method may include receiving, by the network node, a beam report comprising measurement information associated with the plurality of reference signals, wherein the measurement information is based on an output of a linear PCA filter.

Some aspects described herein relate to a non-transitory computer-readable medium that stores a set of instructions for wireless communication by a UE. The set of instructions, when executed by one or more processors of the UE, may cause the UE to receive a plurality of reference signals, each reference signal of the plurality of reference signals corresponding to a beam of a plurality of beams. The set of instructions, when executed by one or more processors of the UE, may cause the UE to transmit a beam report comprising measurement information associated with the plurality of reference signals, wherein the measurement information is based on an output of a linear PCA filter.

Some aspects described herein relate to a non-transitory computer-readable medium that stores a set of instructions for wireless communication by a network node. The set of instructions, when executed by one or more processors of the network node, may cause the network node to transmit a plurality of reference signals, each reference signal of the plurality of reference signals corresponding to a beam of a plurality of beams. The set of instructions, when executed by one or more processors of the network node, may cause the network node to receive a beam report comprising measurement information associated with the plurality of reference signals, wherein the measurement information is based on an output of a linear PCA filter.

Some aspects described herein relate to an apparatus for wireless communication. The apparatus may include means for receiving a plurality of reference signals, each reference signal of the plurality of reference signals corresponding to a beam of a plurality of beams. The apparatus may include means for transmitting a beam report comprising measurement information associated with the plurality of reference signals, wherein the measurement information is based on an output of a linear PCA filter.

Some aspects described herein relate to an apparatus for wireless communication. The apparatus may include means for transmitting a plurality of reference signals, each reference signal of the plurality of reference signals corresponding to a beam of a plurality of beams. The apparatus may include means for receiving a beam report comprising measurement information associated with the plurality of reference signals, wherein the measurement information is based on an output of a linear PCA filter.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example associated with machine learning (ML) models for beam prediction, in accordance with the present disclosure.

FIG. 6 is a diagram illustrating an example process performed, for example, at a UE or an apparatus of a UE, in accordance with the present disclosure.

FIG. 7 is a diagram illustrating an example process performed, for example, at a network node or an apparatus of a network node, in accordance with the present disclosure.

DETAILED DESCRIPTION

Figure 1:
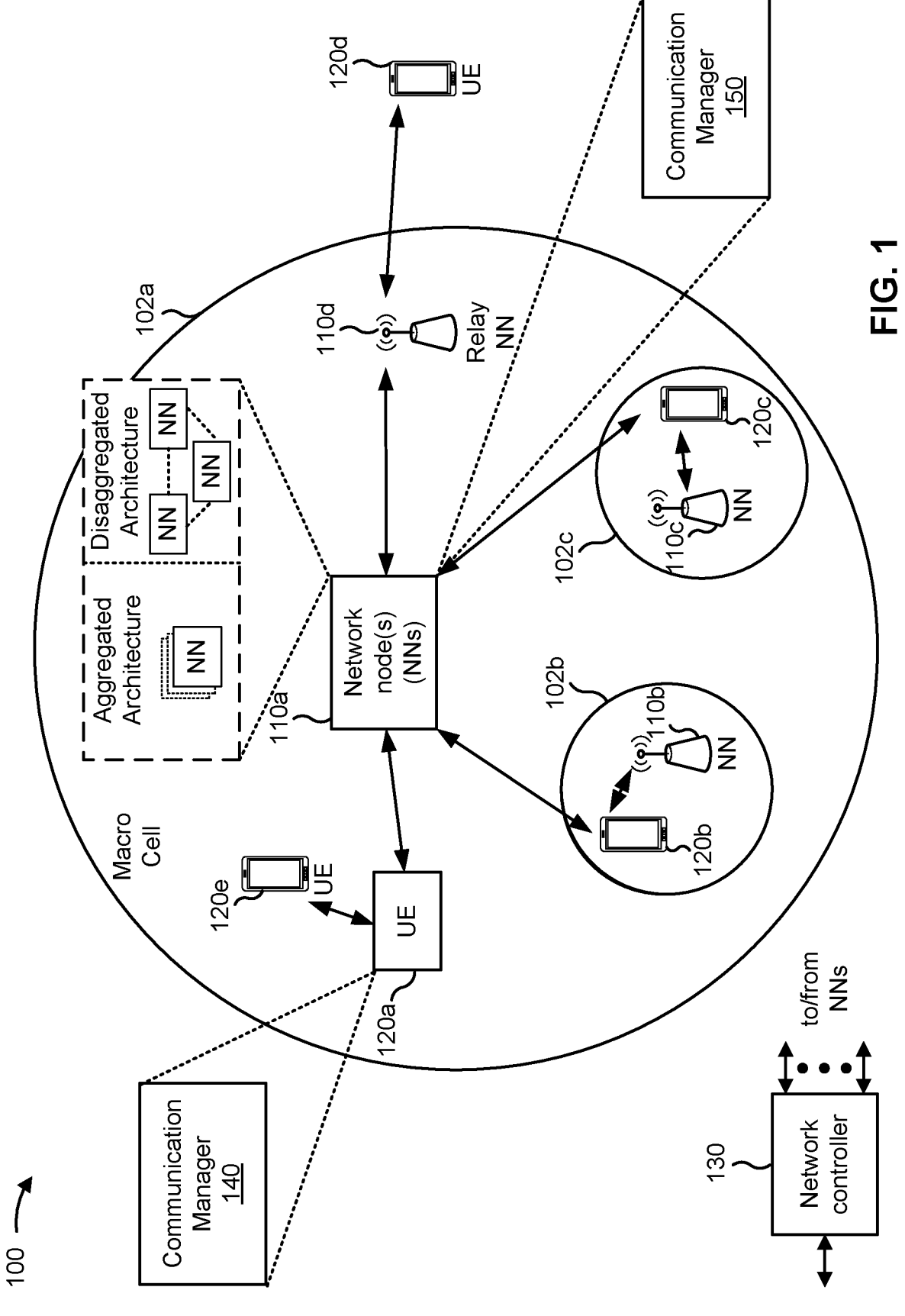
FIG. 1 is a diagram illustrating an example of a wireless network, in accordance with the present disclosure.

A network node may configure a user equipment (UE) to perform measurements, such as channel measurements, interference measurements, and/or the like. In communication systems utilizing beamforming, these measurements may be performed for different beams. For example, a network node may transmit a reference signal on a transmit beam, and a UE may measure the reference signal by generating a receive beam. A combination of a transmit beam and a receive beam may be referred to as a beam pair. The transmit beam and/or the receive beam of the beam pair may be referred to as a candidate beam. The UE may measure multiple beam pairs to identify one or more suitable beam pairs for communication between the UE and the network node. The UE may transmit a measurement report indicating measurement values for a set of beam pairs. The measurement values may indicate, for example, a Layer 1 reference signal received power (L1-RSRP), a Layer 1 signal to interference plus noise (L1-SINR), a channel state information (CSI) resource indicator RSRP (CRI-RSRP), a synchronization signal block index RSRP (SSB-Index-RSRP), a CRI-SINR, and/or a synchronization signal block (SSB)-Index-SINR, among other examples.

For network node beam prediction, a UE may need to feedback a larger number of RSRPs (e.g., for each measured beam across each different time step). To reduce beam report overhead, a compression method has been considered. For example, an auto-encoder may be used to compress beam report information. However, an auto-encoder is trained by training data, and the output of compressed bits from the autoencoder may not be explainable. For example, it may not be possible to tell which compressed bit contains the most important information. Additionally, the input format of an autoencoder may be fixed and, thus, the UE may need to measure all of the required occasions to facilitate its operation. In some cases, an autoencoder may consume more computation power resources than linear operations.

Some aspects of the techniques and apparatuses described herein include a linear principal component analysis (PCA)-based approach to compression of measurement information (e.g., RSRPs) associated with beams. For example, in some aspects, a UE may receive a plurality of reference signals, each reference signal of the plurality of reference signals corresponding to a beam of a plurality of beams. The UE may transmit a beam report comprising measurement information associated with the plurality of reference signals. The measurement information may be based on an output of a linear principal component analysis (PCA) filter. By implementing a linear PCA filter, some aspects may enable producing an explainable output, as the output may include a largest singular value that is the most important to report. Some aspects may facilitate reduced signalling overhead by dropping terms corresponding to smaller singular values in the report when the uplink control information (UCI) carrier has a limited payload. In some aspects, implementation of a linear PCA-based approach to beam measurement compression may be compatible with any number of different measurement patterns and may be tolerant of missed measurements. Some aspects also facilitate reduced computational resource consumption by UEs since the computations are largely linear and the singular value decomposition (SVD) of the empirical covariance matrix, which is stable in time, can be precomputed by a network node and provided to the UE. In this way, some aspects may enable UEs to more efficiently collect and provide data to a network node for training and/or inference associated with AI/ML models. Accordingly, some aspects of the techniques described herein may positively impact AI/ML operations and, consequently, network performance.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells.

In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may receive a plurality of reference signals, each reference signal of the plurality of reference signals corresponding to a beam of a plurality of beams; and transmit a beam report comprising measurement information associated with the plurality of reference signals, wherein the measurement information is based on an output of a linear principal component analysis (PCA) filter. Additionally, or alternatively, the communication manager 140 may perform one or more other operations described herein.

In some aspects, a network node (e.g., the network node 110) may include a communication manager 150. As described in more detail elsewhere herein, the communication manager 150 may transmit a plurality of reference signals, each reference signal of the plurality of reference signals corresponding to a beam of a plurality of beams; and receive a beam report comprising measurement information associated with the plurality of reference signals, wherein the measurement information is based on an output of a linear PCA filter. Additionally, or alternatively, the communication manager 150 may perform one or more other operations described herein.

As indicated above, FIG. 1 is provided as an example. Other examples may differ from what is described with regard to FIG. 1.

Figure 2:
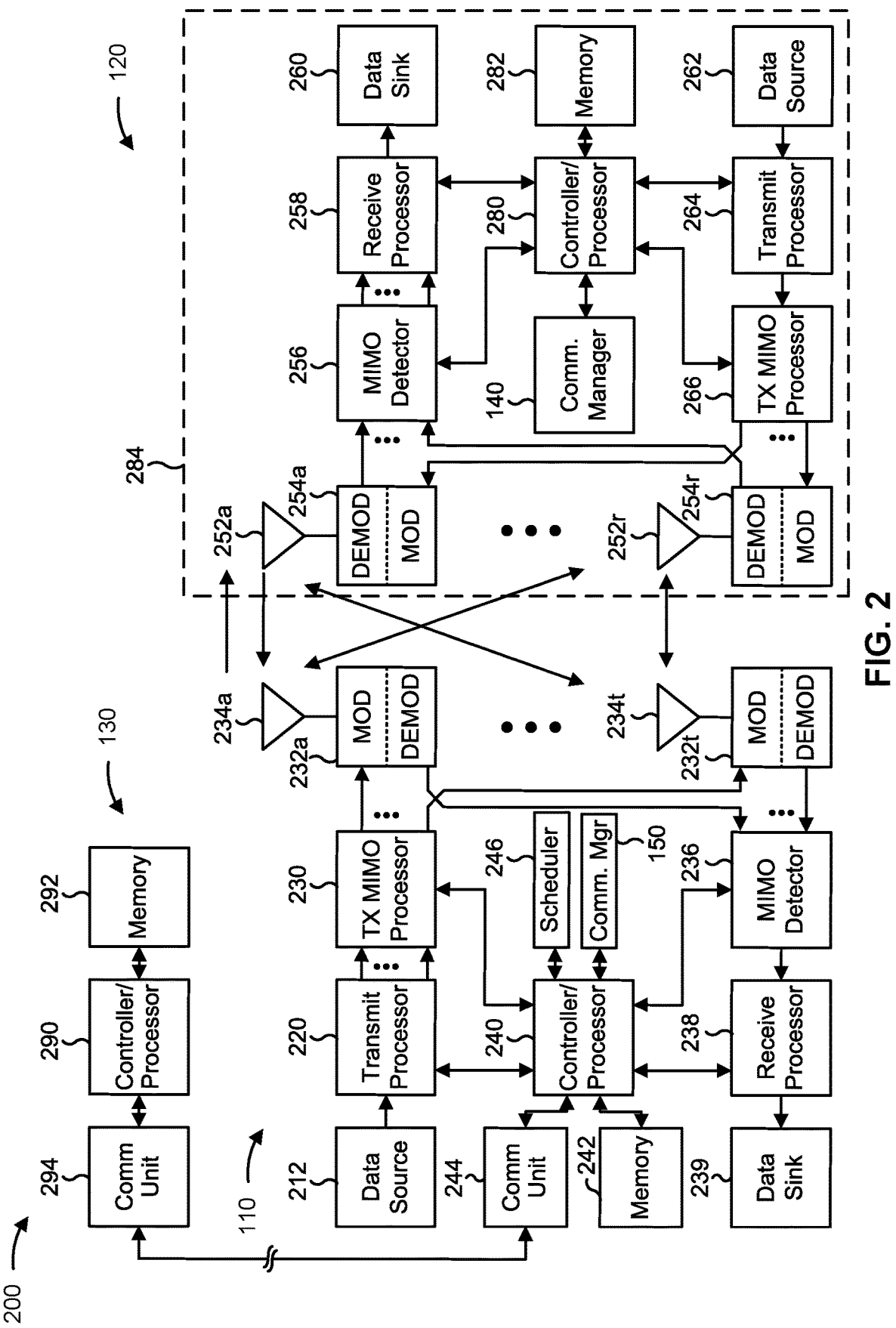
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range. Antenna elements and/or sub-elements may be used to generate beams.

"Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a network node, such as for millimeter wave communications and/or the like. In such a case, the network node may provide the UE with a configuration of transmission configuration indicator (TCI) states that respectively indicate beams that may be used by the UE, such as for receiving a physical downlink shared channel (PDSCH). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. The network node may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a QCL type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the network node 110, the controller/processor 280 of the UE 120, and/or any other component(s) of FIG. 2 may perform one or more techniques associated with beam report compression based on linear PCA, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving, by the UE, a plurality of reference signals, each reference signal of the plurality of reference signals corresponding to a beam of a plurality of beams; and/or means for transmitting, by the UE, a beam report comprising measurement information associated with the plurality of reference signals, wherein the measurement information is based on an output of a linear PCA filter. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting, by the network node, a plurality of reference signals, each reference signal of the plurality of reference signals corresponding to a beam of a plurality of beams; and/or means for receiving, by the network node, a beam report comprising measurement information associated with the plurality of reference signals, wherein the measurement information is based on an output of a linear PCA filter. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
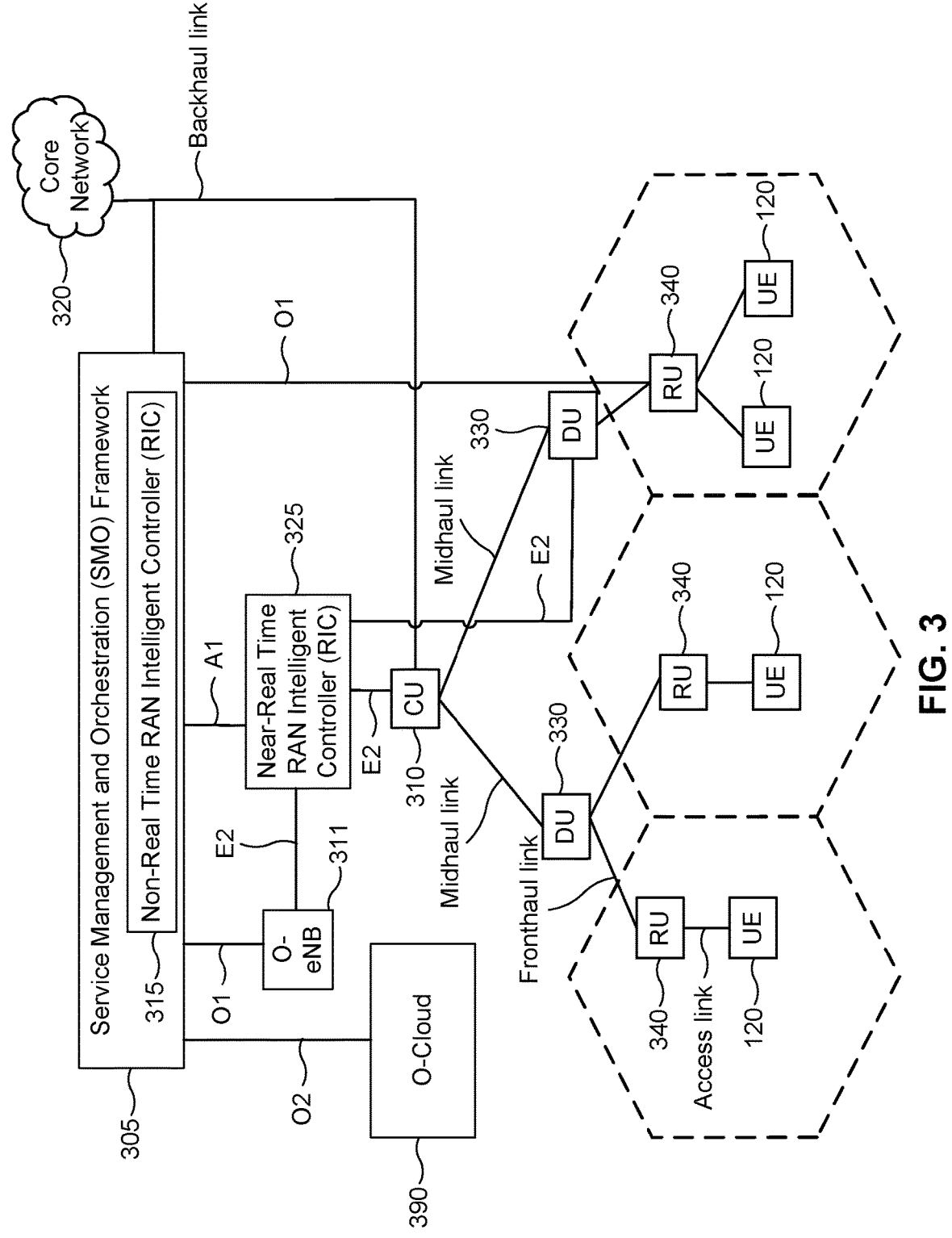
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

AI/ML for an air interface may be applicable to various use cases, such as channel state information (CSI) feedback enhancements (e.g., overhead reduction, improved accuracy, and/or prediction), beam management (e.g., beam prediction in time, and/or spatial domain for overhead and latency reduction, or beam selection accuracy improvement), and/or positioning accuracy enhancements for different scenarios (e.g., heavy non-line-of-sight (NLOS) conditions). An AI/ML framework may involve capability indications, configuration procedures (e.g., training and/or inference), validation and testing procedures, and management of data and an AI/ML model. AI/ML for a next generation (NG)-RAN may involve specifying data collection enhancements and signaling support over current NG-RAN interfaces and architecture (e.g., non-split architecture and split architecture) for AI/ML-based network energy saving, load balancing, and mobility optimization. Network entities and interface procedures may support data management and model management, which may include multi-vendor interoperability between different AI/ML functions (e.g., data collection, model training, and/or model inference), and/or an integration and collaboration of operations, administration, and maintenance (OAM) AI/ML, 5G core (5GC) AI/ML, NG-RAN AI/ML, and air interface AI/ML.

Beam prediction may involve using measurements (e.g., RSRP measurements) of a first beam set to predict metrics of a second beam set in a time domain and/or in a spatial domain. The second beam set may include the same beams or a different set of beams as compared to the first beam set. Predicted metrics may include upcoming RSRP measurements, best beam indexes, or other related metrics. A network node May train an ML model for beam prediction. The ML model for beam prediction may be run at a UE or at the network node. When the ML model for beam prediction is run at the network node only (e.g., the ML model for beam prediction is not run at the UE), the network node may configure the UE to obtain and report measurements. The network node may run the ML model for beam prediction based at least in part on the UE's reported measurements. The network node may perform a scheduling decision based at least in part on a beam prediction result. The UE may not report all local measurements. For example, the UE may only report measurements for a maximum quantity of beams, reported measurements may be quantized, and no receive (Rx) beam information may be available. In some cases, the UE may run the ML model for beam prediction based at least in part on a network node configuration. When the ML model for beam prediction is also configured at the UE, the network node may configure the ML model for beam prediction at the UE, and the UE may perform beam prediction based at least in part on measurements. The UE may report a beam prediction result to the network node.

FIG. 4 is a diagram illustrating an example 400 associated with ML models for beam prediction, in accordance with the present disclosure.

As shown by reference number 402, an ML model for beam prediction may run at a network node. A UE may feed back CSI with a beam report. The UE may feed back an SRS. The network node may run the ML model for beam prediction based at least in part on feedback received from the UE. The network node may determine a beam prediction result using the ML model for beam prediction. The network node may perform a scheduling decision for the UE based at least in part on the beam prediction result. The ML model for beam prediction may be run at the network node when the UE is power and/or computation power limited.

In some cases, for example, as shown, the ML model may include a neural network model 404. The neural network model 404 may support (e.g., may be configured to implement, execute, and/or otherwise use) a neural network function (NNF), Y=F(X), where X is an input to the NNF and Y is an output of the NNF. In some cases, a neural network model 404 may implement more than one NNF and each NNF may be identified by a standardized NNF identifier (ID). In some cases, non-standardized IDs of NNFs can be utilized for private extensions of a wireless communication standard. In some cases, the input X and input Y can be standardized and can be communicated using specified information elements (IEs) to support inter-vendor networking. In some cases, optional IEs can be used for more flexible implementation. In some cases, one NNF can be supported by multiple neural network models 404.

As shown, the neural network model 404 may be defined by a model structure 406 and a parameter set 408. The model structure 406 may be identified by a model ID. In some cases, the model structure (e.g., identified by a model ID) may include a default parameter set. The model ID may be unique within a network in which the neural network model 404 is implemented. In some cases, each model ID can be associated with a respective NNF. In some cases, more than one model ID may be associated with an NNF. The parameter set 408 may include weights of the neural network model and/or other configuration parameters. In some cases, the parameter set 408 may be associated with a location, a configuration, an environment, and/or a channel condition, among other examples.

In some cases, for example, one or more UEs and/or network nodes may train an algorithm to predict a future RSRP of a set of beams based on past measurements of another set of beams (or the same set of beams). In some cases, the algorithm can be a recursive neural network algorithm or a non-recursive algorithm. In some cases, the algorithm can be trained and maintained by the network node. In some cases, the algorithm can be run by the network node and/or the UE. In some cases, for example, a subset of synchronization signal blocks (SSBs) can be measured to predict future SSBs. In some cases, SSBs can be measured to predict some refined channel state information (CSI) reference signal (CSI-RS) beams for unicast physical downlink shared channel (PDSCH) communications and/or physical downlink control channel (PDCCH) communications. In some cases, an output of the neural network model 404 can be a best beam ID at a future time or other related metric at a future time. In this way, implementations of neural network models may be used to save reference signal overhead (as reference signals can be sent less frequently), uplink feedback (as the UE need not feedback channel estimations as frequently), and/or UE power (as the UE need not measure and feedback information as frequently).

As shown by reference number 410, an ML model for beam prediction may be run at a UE. The ML model for beam prediction may be configured by a network node. The UE may run the ML model for beam prediction based at least in part on local measurements and signaling from the network node. The UE may report, to the network node, a beam prediction result based at least in part on a configuration or triggering condition. The UE may run the ML model for beam prediction because the UE may generally have more measurement results, as compared to the network node, and running the ML model for beam prediction at the UE may involve less overhead for reporting. In some cases, the ML model may be distributed across a number of UEs and/or network nodes. In some cases, an ML model implemented (at least in part) at a network node may use, as input, data collected from a number of UEs.

In some cases, AI/ML models may be trained using data collected based on reference signals (e.g., downlink reference signals) received from the network node. For example, in some cases, a downlink reference signal may include an SSB, a CSI-RS, a demodulation reference signal (DMRS), a positioning reference signal (PRS), or a phase tracking reference signal (PTRS), among other examples. An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the network node may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node may configure a set of CSI-RSs for the UE, and the UE may measure the configured set of CSI-RSs. Based at least in part on the measurements, the UE may perform channel estimation and may report channel estimation parameters to the network node (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The network node may use the CSI report to select transmission parameters for downlink communications to the UE, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A network node may configure a UE to perform measurements, such as channel measurements, interference measurements, and/or the like. In communication systems utilizing beamforming, such as those using an NR radio access technology (RAT) in a higher frequency range (e.g., FR2, Frequency Range 4, or a higher frequency range), these measurements may be performed for different beams. For example, a network node may transmit a reference signal on a transmit beam, and a UE may measure the reference signal by generating a receive beam. A combination of a transmit beam and a receive beam may be referred to as a beam pair. The transmit beam and/or the receive beam of the beam pair may be referred to as a candidate beam. The UE may measure multiple beam pairs to identify one or more suitable beam pairs for communication between the UE and the network node. The UE may transmit a measurement report indicating measurement values for a set of beam pairs. The measurement values may indicate, for example, a Layer 1 reference signal received power (L1-RSRP), a Layer 1 signal to interference plus noise (L1-SINR), a CSI resource indicator RSRP (CRI-RSRP), a synchronization signal block index RSRP (SSB-Index-RSRP), a CRI-SINR, and/or an SSB-Index-SINR, among other examples.

In some cases, a UE may be configured with one or more measurement resources. The one or more measurement resources may include, for example, one or more channel measurement resources (CMRs) and/or one or more interference measurement resources (IMRs). A CMR indicates a resource in which the UE is to determine a channel measurement. For example, the UE may determine an L1-RSRP value based at least in part on a CMR. An IMR indicates a resource based at least in part on which the UE is to determine an interference measurement. For example, the UE may determine an L1-SINR value or an L1 reference signal received quality (RSRQ) based at least in part on a CMR and IMR pair.

For network node beam prediction, a UE may need to feedback a larger number of RSRPs (e.g., for each measured beam across each different time step). To reduce beam report overhead, a compression method has been considered. For example, an auto-encoder may be used to compress beam report information. However, an auto-encoder is trained by training data, and the output of compressed bits from the autoencoder may not be explainable. For example, it may not be possible to tell which compressed bit contains the most important information. Additionally, the input format of an autoencoder may be fixed and, thus, the UE may need to measure all of the required occasions to facilitate its operation. In some cases, an autoencoder may consume more computation power resources than linear operations.

Some aspects of the techniques and apparatuses described herein include a linear principal component analysis (PCA)-based approach to compression of measurement information (e.g., RSRPs) associated with beams. For example, in some aspects, a UE may receive a plurality of reference signals, each reference signal of the plurality of reference signals corresponding to a beam of a plurality of beams. The UE may transmit a beam report comprising measurement information associated with the plurality of reference signals. The measurement information may be based on an output of a linear principal component analysis (PCA) filter. By implementing a linear PCA filter, some aspects may enable producing an explainable output, as the output may include a largest singular value that is the most important to report. Some aspects may facilitate reduced signalling overhead by dropping terms corresponding to smaller singular values in the report when the uplink control information (UCI) carrier (e.g., via a PUSCH and/or a PUCCH) has a limited payload. In some aspects, implementation of a linear PCA-based approach to beam measurement compression may be compatible with any number of different measurement patterns and may be tolerant of missed measurements. Some aspects also facilitate reduced computational resource consumption by UEs since the computations are largely linear and the singular value decomposition (SVD) of the empirical covariance matrix, which is stable in time, can be precomputed by a network node and provided to the UE. In this way, some aspects may enable UEs to more efficiently collect and provide data to a network node for training and/or inference associated with AI/ML models. Accordingly, some aspects of the techniques described herein may positively impact AI/ML operations and, consequently, network performance.

As indicated above, FIG. 4 is provided as an example. Other examples may differ from what is described with regard to FIG. 4.

Figure 5:
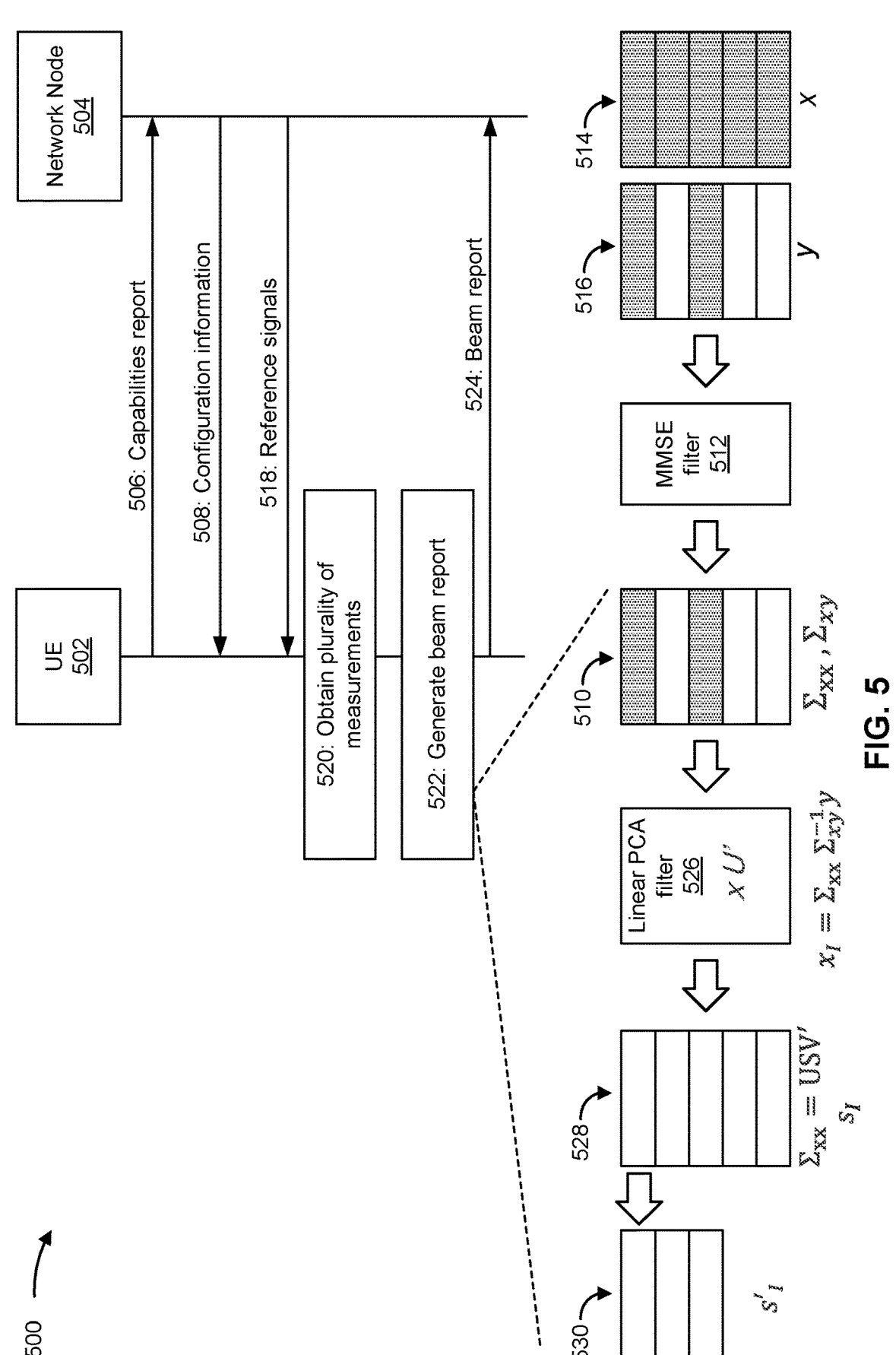
FIG. 5 is a diagram of an example associated with beam report compression based on linear principal component analysis (PCA), in accordance with the present disclosure.

FIG. 5 is a diagram of an example 500 associated with beam report compression based on linear PCA, in accordance with the present disclosure. As shown in FIG. 5, a UE 502 may communicate with a network node 504. In some aspects, the network UE 502 and the network node 504 may be part of a wireless network (e.g., wireless network 100). In some aspects, actions described as being performed by the network node 504 may be performed by multiple different network nodes. For example, configuration actions may be performed by a first network node 504 (e.g., a CU and/or a DU), and radio communication actions may be performed by a second network node 504 (e.g., a DU and/or an RU). The UE 502 and the network node 504 may have established a wireless connection prior to operations shown in FIG. 5. In some aspects, the UE 502 may be, be similar to, include, or be included in, the UE 120 depicted in FIGS. 1-3. In some aspects, the network node 504 may be, be similar to, include, or be included in, the network node 110 depicted in FIGS. 1 and 2, and/or one or more components of the disaggregated base station architecture 300 depicted in FIG. 3.

As shown by reference number 506, the UE 502 may transmit, and the network node 504 may receive (directly or via one or more other network nodes), a capabilities report. In some aspects, the capabilities report may indicate UE support for generating and providing beam reports (e.g., CSI reports) based on linear PCA.

As shown by reference number 508, the network node 504 may transmit (directly or via one or more other network nodes), and the UE 502 may receive, configuration information. In some aspects, the UE 502 may receive the configuration information via one or more of radio resource control (RRC) signaling, one or more medium access control (MAC) control elements (CEs), and/or downlink control information (DCI), among other examples. In some aspects, the configuration information may include an indication of one or more configuration parameters (e.g., already known to the UE 502 and/or previously indicated by the network node 504 or other network device) for selection by the UE 502, and/or explicit configuration information for the UE 502 to use to configure the UE 502, among other examples.

In some aspects, the configuration information may indicate that the UE 502 is to obtain measurements associated with reference signals transmitted by the network node 504 and to provide, to the network node 504, measurement information (e.g., via a beam report) associated with the measurements. The configuration information May indicate that the UE 502 is to compress the beam report based on a linear PCA. In some aspects, the configuration information may include an indication of a covariance matrix 510. In some aspects, the indication of the covariance matrix may be provided independently of the configuration information. The covariance matrix 510 may be associated with a minimum mean squared error (MMSE) filter 512. For example, as shown, the covariance matrix $\Sigma_{xx}$, $\Sigma_{xy}$ 510 may be an output of the MMSE filter 512 that takes a first covariance matrix $\Sigma_{xx}$ 514 and a second covariance matrix $\Sigma_{xy}$ 516 as input. The first covariance matrix 514 may be a covariance matrix in a time domain and the second covariance matrix 516 may be a covariance matrix in a spatial domain. In some aspects, the second covariance matrix 516 may be a submatrix of the first covariance matrix 514.

The covariance matrix 510 may be a long-term averaged covariance matrix associated with at least one of the UE 502 or an additional UE. For example, in some aspects, the covariance matrix 510 may be empirically computed by the network node 504 by averaging different reported measurements from different UEs reporting of the same signal region over a specified period of time. The signal region may be a cell. For example, in some aspects, the covariance matrix 510 may be based on a set of vectors, each vector of the set of vectors corresponding to a beam of the plurality of beams and a time stamp of a plurality of time stamps. In some aspects, the covariance matrix 510 may include a Kronecker product of the first covariance matrix 514 and the second covariance matrix 516. In some aspects, the network node 504 may provide, to the UE 502, an indication of the covariance matrix 510 and, in some other aspects, the network node 504 may provide, to the UE 502, an indication of the first covariance matrix 514 and the second covariance matrix 516.

The UE 502 may configure itself based at least in part on the configuration information. In some aspects, the UE 502 may be configured to perform one or more operations described herein based at least in part on the configuration information.

As shown by reference number 518, the network node 504 may transmit, and the UE 502 may receive, a plurality of reference signals. For example, the plurality of reference signals may include at least one CSI-RS and/or at least one SSB, among other examples. Each reference signal of the plurality of reference signals may correspond to a beam of a plurality of beams. As shown by reference number 520, the UE 502 may obtain a plurality of measurements. For example, the UE 502 may obtain a plurality of measurements associated with the plurality of reference signals. In some aspects, the plurality of measurements may include a plurality of layer 1 reference signal measurements. The plurality of measurements may include at least one of a precoding matrix indicator (PMI), a rank indicator (RI), a channel quality indicator (CQI), a layer indicator, an angle of arrival (AoA), an angle of departure (AoD), a direction of arrival (DoA), a direction of departure (DoD), a channel impulse response (CIR), a signal to interference plus noise ratio (SINR), or a reference signal received power (RSRP).

As shown by reference number 522, the UE 502 may generate a beam report and, as shown by reference number 524, the UE 502 may transmit, and the network node 504 may receive, the beam report. In some aspects, the beam report may include measurement information associated with the plurality of reference signals. The measurement information may be based on an output of a linear PCA filter 526. For example, the MMSE filter 512 may be used to generate the covariance matrix 510 based on the provided covariance matrices 514 and 516, along with measurements obtained by the UE 502. The linear PCA filter 526 may be used to convert the covariance matrix 510 to a feature space vector $s_t$ 528. The UE 502 may select a specified (or dynamically determined) dimensions $s'_t$ 530 of the feature space vector 528 for inclusion in the beam report. Thus, the measurement information may include a subset of the set of values in the feature space vector 528.

In some aspects, the subset of the set of values may omit, based on a maximum payload associated with the beam report, one or more values of the set of values. For example, when not all entries in the feature space vector 528 can be sent in a report, the entries corresponding to smaller singular values may be omitted from the report. In some aspects, a two part CSI report may be used. For example, the beam report may include a first CSI report part that includes a first subset of the set of values and a second CSI report part that includes a second subset of the set of values. The first CSI report part may indicate a payload size of the second CSI report part. The first subset may be associated with a prediction associated with a future time metric (e.g., a future RSRP). The second subset may be associated with at least one additional prediction associated with at least one additional future time metric. In some aspects, the first subset may be associated with a set of anchor time stamps and the second subset may be associated with a set of additional time stamps. In some aspects, the anchor time stamps of the set of anchor time stamps may occur periodically. In some aspects, the time stamps of the set of additional time stamps may not be periodic.

As indicated above, FIG. 5 is provided as an example. Other examples may differ from what is described with respect to FIG. 5.

FIG. 6 is a diagram illustrating an example process 600 performed, for example, at a UE or an apparatus of a UE, in accordance with the present disclosure. Example process 600 is an example where the apparatus or the UE (e.g., UE 502) performs operations associated with beam report compression based on linear PCA.

As shown in FIG. 6, in some aspects, process 600 may include receiving a plurality of reference signals, each reference signal of the plurality of reference signals corresponding to a beam of a plurality of beams (block 610). For example, the UE (e.g., using reception component 802 and/or communication manager 806, depicted in FIG. 8) may receive a plurality of reference signals, each reference signal of the plurality of reference signals corresponding to a beam of a plurality of beams, as described above.

As further shown in FIG. 6, in some aspects, process 600 may include transmitting a beam report comprising measurement information associated with the plurality of reference signals, wherein the measurement information is based on an output of a linear PCA filter (block 620). For example, the UE (e.g., using transmission component 804 and/or communication manager 806, depicted in FIG. 8) may transmit a beam report comprising measurement information associated with the plurality of reference signals, wherein the measurement information is based on an output of a linear PCA filter, as described above.

Process 600 may include additional aspects, such as any single aspect or any combination of aspects described below and/or in connection with one or more other processes described elsewhere herein.

In a first aspect, output of the linear PCA filter is based on an input to the linear PCA filter, the input comprising a covariance matrix associated with an MMSE filter. In a second aspect, alone or in combination with the first aspect, the covariance matrix comprises a long-term averaged covariance matrix associated with at least one of the UE or an additional UE. In a third aspect, alone or in combination with one or more of the first and second aspects, the long-term averaged covariance matrix is associated with a signal region. In a fourth aspect, alone or in combination with one or more of the first through third aspects, the signal region comprises a cell.

In a fifth aspect, alone or in combination with one or more of the first through fourth aspects, the covariance matrix is based on a set of vectors, each vector of the set of vectors corresponding to a beam of the plurality of beams and a time stamp of a plurality of time stamps. In a sixth aspect, alone or in combination with one or more of the first through fifth aspects, process 600 includes receiving an indication of the covariance matrix. In a seventh aspect, alone or in combination with one or more of the first through sixth aspects, the covariance matrix comprises a Kronecker product of a first covariance matrix associated with a time domain and a spatial domain and a second covariance matrix associated with the time domain and the spatial domain. In an eighth aspect, alone or in combination with one or more of the first through seventh aspects, process 600 includes receiving an indication of the first covariance matrix and the second covariance matrix.

In a ninth aspect, alone or in combination with one or more of the first through eighth aspects, the output of the linear PCA filter comprises a set of values in a feature space vector of the covariance matrix. In a tenth aspect, alone or in combination with one or more of the first through ninth aspects, the measurement information comprises a subset of the set of values. In an eleventh aspect, alone or in combination with one or more of the first through tenth aspects, the subset of the set of values omits, based on a maximum payload associated with the beam report, one or more values of the set of values.

In a twelfth aspect, alone or in combination with one or more of the first through eleventh aspects, the beam report comprises a first CSI report part comprising a first subset of the set of values and a second CSI report part comprising a second subset of the set of values. In a thirteenth aspect, alone or in combination with one or more of the first through twelfth aspects, the first CSI report part indicates a payload size of the second CSI report part. In a fourteenth aspect, alone or in combination with one or more of the first through thirteenth aspects, the first subset is associated with a prediction associated with a future time metric. In a fifteenth aspect, alone or in combination with one or more of the first through fourteenth aspects, the second subset is associated with at least one additional prediction associated with at least one additional future time metric. In a sixteenth aspect, alone or in combination with one or more of the first through fifteenth aspects, the first subset is associated with a set of anchor time stamps. In a seventeenth aspect, alone or in combination with one or more of the first through sixteenth aspects, the second subset is associated with a set of additional time stamps. In an eighteenth aspect, alone or in combination with one or more of the first through seventeenth aspects, the anchor time stamps of the set of anchor time stamps occur periodically.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, at a network node or an apparatus of a network node, in accordance with the present disclosure. Example process 700 is an example where the apparatus or the network node (e.g., network node 504) performs operations associated with beam report compression based on linear PCA.

As shown in FIG. 7, in some aspects, process 700 may include transmitting a plurality of reference signals, each reference signal of the plurality of reference signals corresponding to a beam of a plurality of beams (block 710). For example, the network node (e.g., using transmission component 904 and/or communication manager 906, depicted in FIG. 9) may transmit a plurality of reference signals, each reference signal of the plurality of reference signals corresponding to a beam of a plurality of beams, as described above.

As further shown in FIG. 7, in some aspects, process 700 may include receiving a beam report comprising measurement information associated with the plurality of reference signals, wherein the measurement information is based on an output of a linear PCA filter (block 720). For example, the network node (e.g., using reception component 902 and/or communication manager 906, depicted in FIG. 9) may receive a beam report comprising measurement information associated with the plurality of reference signals, wherein the measurement information is based on an output of a linear PCA filter, as described above.

Process 700 may include additional aspects, such as any single aspect or any combination of aspects described below and/or in connection with one or more other processes described elsewhere herein.

In a first aspect, output of the linear PCA filter is based on an input to the linear PCA filter, the input comprising a covariance matrix associated with an MMSE filter. In a second aspect, alone or in combination with the first aspect, the covariance matrix comprises a long-term averaged covariance matrix associated with at least one of the UE or an additional UE. In a third aspect, alone or in combination with one or more of the first and second aspects, the long-term averaged covariance matrix is associated with a signal region. In a fourth aspect, alone or in combination with one or more of the first through third aspects, the signal region comprises a cell. In a fifth aspect, alone or in combination with one or more of the first through fourth aspects, the covariance matrix is based on a set of vectors, each vector of the set of vectors corresponding to a beam of the plurality of beams and a time stamp of a plurality of time stamps. In a sixth aspect, alone or in combination with one or more of the first through fifth aspects, process 700 includes transmitting an indication of the covariance matrix. In a seventh aspect, alone or in combination with one or more of the first through sixth aspects, the covariance matrix comprises a Kronecker product of a first covariance matrix associated with a time domain and a spatial domain and a second covariance matrix associated with the time domain and the spatial domain. In an eighth aspect, alone or in combination with one or more of the first through seventh aspects, process 700 includes transmitting an indication of the first covariance matrix and the second covariance matrix.

In a ninth aspect, alone or in combination with one or more of the first through eighth aspects, the output of the linear PCA filter comprises a set of values in a feature space vector of the covariance matrix. In a tenth aspect, alone or in combination with one or more of the first through ninth aspects, the measurement information comprises a subset of the set of values. In an eleventh aspect, alone or in combination with one or more of the first through tenth aspects, the subset of the set of values omits, based on a maximum payload associated with the beam report, one or more values of the set of values. In a twelfth aspect, alone or in combination with one or more of the first through eleventh aspects, the beam report comprises a first CSI report part comprising a first subset of the set of values and a second CSI report part comprising a second subset of the set of values. In a thirteenth aspect, alone or in combination with one or more of the first through twelfth aspects, the first CSI report part indicates a payload size of the second CSI report part.

In a fourteenth aspect, alone or in combination with one or more of the first through thirteenth aspects, the first subset is associated with a prediction associated with a future time metric. In a fifteenth aspect, alone or in combination with one or more of the first through fourteenth aspects, the second subset is associated with at least one additional prediction associated with at least one additional future time metric. In a sixteenth aspect, alone or in combination with one or more of the first through fifteenth aspects, the first subset is associated with a set of anchor time stamps. In a seventeenth aspect, alone or in combination with one or more of the first through sixteenth aspects, the second subset is associated with a set of additional time stamps. In an eighteenth aspect, alone or in combination with one or more of the first through seventeenth aspects, the anchor time stamps of the set of anchor time stamps occur periodically.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
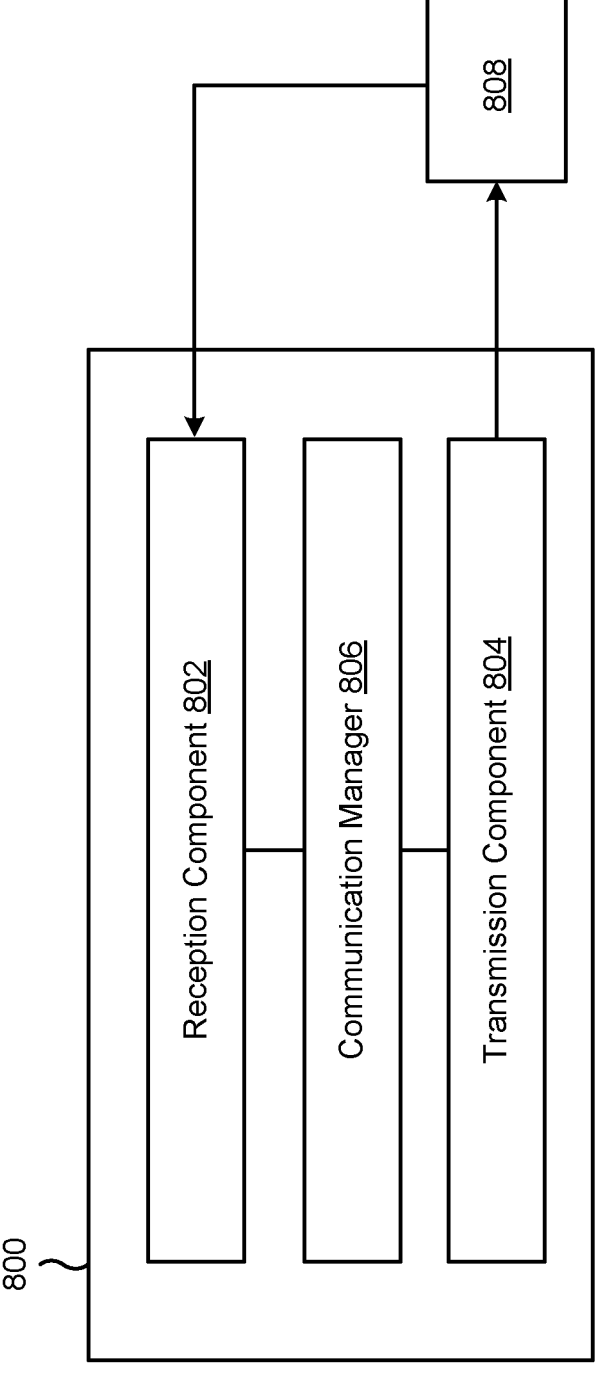
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6 or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 804 may be co-located with the reception component 802 in one or more transceivers.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The reception component 802 may receive a plurality of reference signals, each reference signal of the plurality of reference signals corresponding to a beam of a plurality of beams. The transmission component 804 may transmit a beam report comprising measurement information associated with the plurality of reference signals, wherein the measurement information is based on an output of a linear PCA filter. The reception component 802 may receive an indication of the covariance matrix. The reception component 802 may receive an indication of the first covariance matrix and the second covariance matrix.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
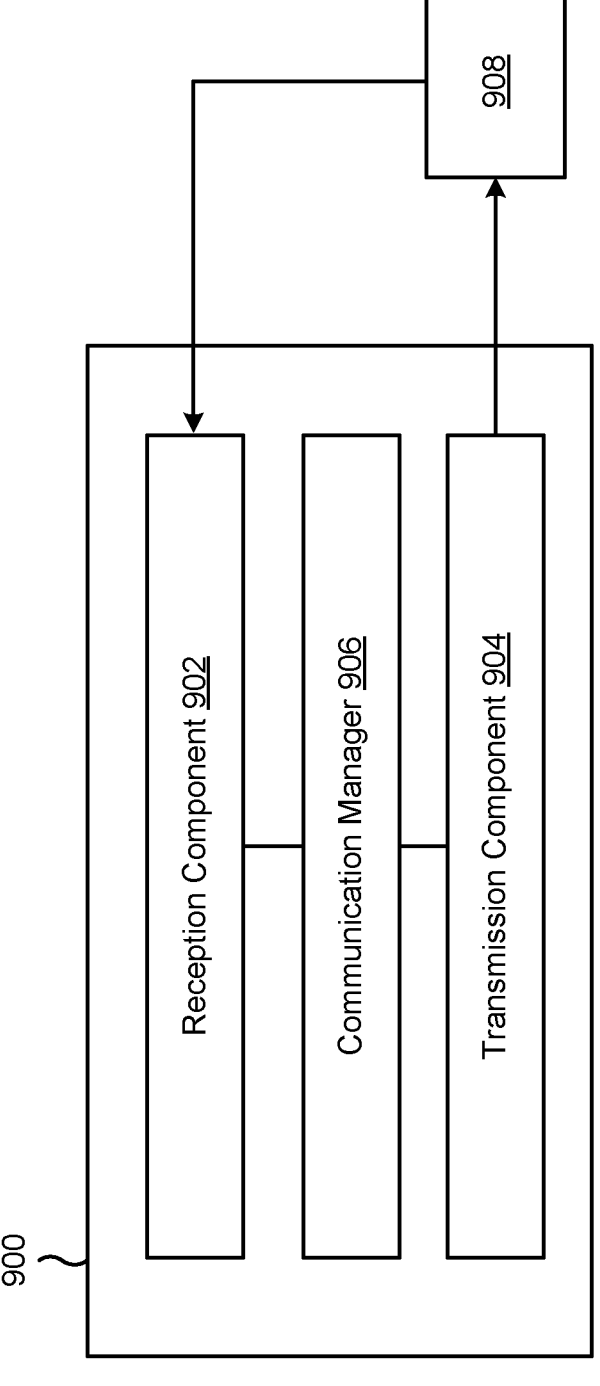
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The transmission component 904 may transmit a plurality of reference signals, each reference signal of the plurality of reference signals corresponding to a beam of a plurality of beams. The reception component 902 may receive a beam report comprising measurement information associated with the plurality of reference signals, wherein the measurement information is based on an output of a linear PCA filter. The transmission component 904 may transmit an indication of the covariance matrix. The transmission component 904 may transmit an indication of the first covariance matrix and the second covariance matrix.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving, by the UE, a plurality of reference signals, each reference signal of the plurality of reference signals corresponding to a beam of a plurality of beams; and transmitting, by the UE, a beam report comprising measurement information associated with the plurality of reference signals, wherein the measurement information is based on an output of a linear principal component analysis (PCA) filter.

Aspect 2: The method of Aspect 1, wherein output of the linear PCA filter is based on an input to the linear PCA filter, the input comprising a covariance matrix associated with a minimum mean squared error (MMSE) filter.

Aspect 3: The method of Aspect 2, wherein the covariance matrix comprises a long-term averaged covariance matrix associated with at least one of the UE or an additional UE.

Aspect 4: The method of Aspect 3, wherein the long-term averaged covariance matrix is associated with a signal region.

Aspect 5: The method of Aspect 4, wherein the signal region comprises a cell.

Aspect 6: The method of any of Aspects 2-5, wherein the covariance matrix is based on a set of vectors, each vector of the set of vectors corresponding to a beam of the plurality of beams and a time stamp of a plurality of time stamps.

Aspect 7: The method of any of Aspects 2-6, further comprising receiving an indication of the covariance matrix.

Aspect 8: The method of any of Aspects 2-7, wherein the covariance matrix comprises a Kronecker product of a first covariance matrix associated with a time domain and a spatial domain and a second covariance matrix associated with the time domain and the spatial domain.

Aspect 9: The method of Aspect 8, further comprising receiving an indication of the first covariance matrix and the second covariance matrix.

Aspect 10: The method of any of Aspects 1-9, wherein the output of the linear PCA filter comprises a set of values in a feature space vector of the covariance matrix.

Aspect 11: The method of Aspect 10, wherein the measurement information comprises a subset of the set of values.

Aspect 12: The method of Aspect 11, wherein the subset of the set of values omits, based on a maximum payload associated with the beam report, one or more values of the set of values.

Aspect 13: The method of any of Aspects 10-12, wherein the beam report comprises a first channel state information (CSI) report part comprising a first subset of the set of values and a second CSI report part comprising a second subset of the set of values.

Aspect 14: The method of Aspect 13, wherein the first CSI report part indicates a payload size of the second CSI report part.

Aspect 15: The method of either of Aspects 13 or 14, wherein the first subset is associated with a prediction associated with a future time metric.

Aspect 16: The method of Aspect 15, wherein the second subset is associated with at least one additional prediction associated with at least one additional future time metric.

Aspect 17: The method of any of Aspects 13-16, wherein the first subset is associated with a set of anchor time stamps.

Aspect 18: The method of Aspect 17, wherein the second subset is associated with a set of additional time stamps.

Aspect 19: The method of either of Aspects 17 or 18, wherein the anchor time stamps of the set of anchor time stamps occur periodically.

Aspect 20: A method of wireless communication performed by a network node, comprising: transmitting, by the network node, a plurality of reference signals, each reference signal of the plurality of reference signals corresponding to a beam of a plurality of beams; and receiving, by the network node, a beam report comprising measurement information associated with the plurality of reference signals, wherein the measurement information is based on an output of a linear principal component analysis (PCA) filter.

Aspect 21: The method of Aspect 20, wherein output of the linear PCA filter is based on an input to the linear PCA filter, the input comprising a covariance matrix associated with a minimum mean squared error (MMSE) filter.

Aspect 22: The method of Aspect 21, wherein the covariance matrix comprises a long-term averaged covariance matrix associated with at least one of the UE or an additional UE.

Aspect 23: The method of Aspect 22, wherein the long-term averaged covariance matrix is associated with a signal region.

Aspect 24: The method of Aspect 23, wherein the signal region comprises a cell.

Aspect 25: The method of any of Aspects 21-24, wherein the covariance matrix is based on a set of vectors, each vector of the set of vectors corresponding to a beam of the plurality of beams and a time stamp of a plurality of time stamps.

Aspect 26: The method of any of Aspects 21-25, further comprising transmitting an indication of the covariance matrix.

Aspect 27: The method of any of Aspects 21-26, wherein the covariance matrix comprises a Kronecker product of a first covariance matrix associated with a time domain and a spatial domain and a second covariance matrix associated with the time domain and the spatial domain.

Aspect 28: The method of Aspect 27, further comprising transmitting an indication of the first covariance matrix and the second covariance matrix.

Aspect 29: The method of any of Aspects 20-28, wherein the output of the linear PCA filter comprises a set of values in a feature space vector of the covariance matrix.

Aspect 30: The method of Aspect 29, wherein the measurement information comprises a subset of the set of values.

Aspect 31: The method of Aspect 30, wherein the subset of the set of values omits, based on a maximum payload associated with the beam report, one or more values of the set of values.

Aspect 32: The method of any of Aspects 29-31, wherein the beam report comprises a first channel state information (CSI) report part comprising a first subset of the set of values and a second CSI report part comprising a second subset of the set of values.

Aspect 33: The method of Aspect 32, wherein the first CSI report part indicates a payload size of the second CSI report part.

Aspect 34: The method of either of Aspects 32 or 33, wherein the first subset is associated with a prediction associated with a future time metric.

Aspect 35: The method of Aspect 34, wherein the second subset is associated with at least one additional prediction associated with at least one additional future time metric.

Aspect 36: The method of any of Aspects 32-35, wherein the first subset is associated with a set of anchor time stamps.

Aspect 37: The method of Aspect 36, wherein the second subset is associated with a set of additional time stamps.

Aspect 38: The method of either of Aspects 36 or 37, wherein the anchor time stamps of the set of anchor time stamps occur periodically.

Aspect 39: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-19.

Aspect 40: An apparatus for wireless communication at a device, the apparatus comprising one or more memories and one or more processors coupled to the one or more memories, the one or more processors configured to cause the device to perform the method of one or more of Aspects 1-19.

Aspect 41: An apparatus for wireless communication, the apparatus comprising at least one means for performing the method of one or more of Aspects 1-19.

Aspect 42: A non-transitory computer-readable medium storing code for wireless communication, the code comprising instructions executable by one or more processors to perform the method of one or more of Aspects 1-19.

Aspect 43: A non-transitory computer-readable medium storing a set of instructions for wireless communication, the set of instructions comprising one or more instructions that, when executed by one or more processors of a device, cause the device to perform the method of one or more of Aspects 1-19.

Aspect 44: A device for wireless communication, the device comprising a processing system that includes one or more processors and one or more memories coupled with the one or more processors, the processing system configured to cause the device to perform the method of one or more of Aspects 1-19.

Aspect 45: An apparatus for wireless communication at a device, the apparatus comprising one or more memories and one or more processors coupled to the one or more memories, the one or more processors individually or collectively configured to cause the device to perform the method of one or more of Aspects 1-19.

Aspect 46: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 20-38.

Aspect 47: An apparatus for wireless communication at a device, the apparatus comprising one or more memories and one or more processors coupled to the one or more memories, the one or more processors configured to cause the device to perform the method of one or more of Aspects 20-38.

Aspect 48: An apparatus for wireless communication, the apparatus comprising at least one means for performing the method of one or more of Aspects 20-38.

Aspect 49: A non-transitory computer-readable medium storing code for wireless communication, the code comprising instructions executable by one or more processors to perform the method of one or more of Aspects 20-38.

Aspect 50: A non-transitory computer-readable medium storing a set of instructions for wireless communication, the set of instructions comprising one or more instructions that, when executed by one or more processors of a device, cause the device to perform the method of one or more of Aspects 20-38.

Aspect 51: A device for wireless communication, the device comprising a processing system that includes one or more processors and one or more memories coupled with the one or more processors, the processing system configured to cause the device to perform the method of one or more of Aspects 20-38.

Aspect 52: An apparatus for wireless communication at a device, the apparatus comprising one or more memories and one or more processors coupled to the one or more memories, the one or more processors individually or collectively configured to cause the device to perform the method of one or more of Aspects 20-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, the one or more processors, individually or collectively and based at least in part on information stored in the one or more memories, being configured to cause the UE to:
   receive a plurality of reference signals, each reference signal of the plurality of reference signals corresponding to a beam of a plurality of beams; and
   transmit a beam report comprising measurement information associated with the plurality of reference signals, wherein the measurement information is based on an output of a linear principal component analysis (PCA) filter.

2. The UE of claim 1, wherein output of the linear PCA filter is based on an input to the linear PCA filter, the input comprising a covariance matrix associated with a minimum mean squared error (MMSE) filter.

3. The UE of claim 2, wherein the covariance matrix comprises a long-term averaged covariance matrix associated with at least one of the UE or an additional UE.

4. The UE of claim 3, wherein the long-term averaged covariance matrix is associated with a signal region.

5. The UE of claim 4, wherein the signal region comprises a cell.

6. The UE of claim 2, wherein the covariance matrix is based on a set of vectors, each vector of the set of vectors corresponding to a beam of the plurality of beams and a time stamp of a plurality of time stamps.

7. The UE of claim 2, wherein the one or more processors are further individually or collectively configured to cause the UE to receive an indication of the covariance matrix.

8. The UE of claim 2, wherein the covariance matrix comprises a Kronecker product of a first covariance matrix associated with a time domain and a spatial domain and a second covariance matrix associated with the time domain and the spatial domain.

9. The UE of claim 8, wherein the one or more processors are further individually or collectively configured to cause the UE to receive an indication of the first covariance matrix and the second covariance matrix.

10. The UE of claim 1, wherein the output of the linear PCA filter comprises a set of values in a feature space vector of the covariance matrix.

11. The UE of claim 10, wherein the measurement information comprises a subset of the set of values.

12. The UE of claim 11, wherein the subset of the set of values omits, based on a maximum payload associated with the beam report, one or more values of the set of values.

13. The UE of claim 10, wherein the beam report comprises a first channel state information (CSI) report part comprising a first subset of the set of values and a second CSI report part comprising a second subset of the set of values.

14. The UE of claim 13, wherein the first CSI report part indicates a payload size of the second CSI report part.

15. The UE of claim 13, wherein the first subset is associated with a prediction associated with a future time metric.

16. The UE of claim 15, wherein the second subset is associated with at least one additional prediction associated with at least one additional future time metric.

17. The UE of claim 13, wherein the first subset is associated with a set of anchor time stamps.

18. The UE of claim 17, wherein the second subset is associated with a set of additional time stamps.

19. The UE of claim 17, wherein the anchor time stamps of the set of anchor time stamps occur periodically.

20. An apparatus for wireless communication at a network, comprising:

one or more memories; and one or more processors, the one or more processors, individually or collectively and based at least in part on information stored in the one or more memories, being configured to cause the network node to:

transmit a plurality of reference signals, each reference signal of the plurality of reference signals corresponding to a beam of a plurality of beams; and receive a beam report comprising measurement information associated with the plurality of reference signals, wherein the measurement information is based on an output of a linear principal component analysis (PCA) filter.

21. The network node of claim 20, wherein output of the linear PCA filter is based on an input to the linear PCA filter, the input comprising a covariance matrix associated with a minimum mean squared error (MMSE) filter.

22. The network node of claim 21, wherein the covariance matrix comprises a long-term averaged covariance matrix associated with at least one of the UE or an additional UE.

23. The network node of claim 21, wherein the one or more processors are further individually or collectively configured to cause the network node to transmit an indication of the covariance matrix.

24. The network node of claim 21, wherein the covariance matrix comprises a Kronecker product of a first covariance matrix associated with a time domain and a spatial domain and a second covariance matrix associated with the time domain and the spatial domain, and wherein the one or more processors are further individually or collectively configured to cause the network node to transmit an indication of the first covariance matrix and the second covariance matrix.

25. The network node of claim 20, wherein the output of the linear PCA filter comprises a set of values in a feature space vector of the covariance matrix, and wherein the beam report comprises a first channel state information (CSI) report part comprising a first subset of the set of values and a second CSI report part comprising a second subset of the set of values.

26. The network node of claim 25, wherein the measurement information comprises a subset of the set of values.

27. A method of wireless communication performed by a user equipment (UE), comprising:

receiving, by the UE, a plurality of reference signals, each reference signal of the plurality of reference signals corresponding to a beam of a plurality of beams; and transmitting, by the UE, a beam report comprising measurement information associated with the plurality of reference signals, wherein the measurement information is based on an output of a linear principal component analysis (PCA) filter.

28. The method of claim 27, wherein output of the linear PCA filter is based on an input to the linear PCA filter, the input comprising a covariance matrix associated with a minimum mean squared error (MMSE) filter.

29. A method of wireless communication performed by a network node, comprising:

transmitting, by the network node, a plurality of reference signals, each reference signal of the plurality of reference signals corresponding to a beam of a plurality of beams; and receiving, by the network node, a beam report comprising measurement information associated with the plurality of reference signals, wherein the measurement information is based on an output of a linear principal component analysis (PCA) filter.

30. The method of claim 29, wherein output of the linear PCA filter is based on an input to the linear PCA filter, the input comprising a covariance matrix associated with a minimum mean squared error (MMSE) filter.

* * * * *